United States Patent
Hirabayashi

(10) Patent No.: US 11,489,968 B2
(45) Date of Patent: Nov. 1, 2022

(54) DEVICE FAILURE INFLUENCE RANGE GRASPING APPARATUS, DEVICE FAILURE INFLUENCE RANGE GRASPING METHOD, AND PROGRAM

(71) Applicant: Nippon Telegraph and Telephone Corporation, Tokyo (JP)

(72) Inventor: Atsushi Hirabayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 134 days.

(21) Appl. No.: 17/043,091

(22) PCT Filed: Apr. 11, 2019

(86) PCT No.: PCT/JP2019/015801
§ 371 (c)(1),
(2) Date: Sep. 29, 2020

(87) PCT Pub. No.: WO2019/198796
PCT Pub. Date: Oct. 17, 2019

(65) Prior Publication Data
US 2021/0021714 A1    Jan. 21, 2021

(30) Foreign Application Priority Data

Apr. 12, 2018 (JP) .............................. JP2018-076631

(51) Int. Cl.
*H04M 15/16* (2006.01)
*H04M 11/00* (2006.01)
*H04W 4/24* (2018.01)

(52) U.S. Cl.
CPC ......... *H04M 15/16* (2013.01); *H04M 11/002* (2013.01); *H04W 4/24* (2013.01)

(58) Field of Classification Search
None
See application file for complete search history.

(56) References Cited

U.S. PATENT DOCUMENTS

| | | | | |
|---|---|---|---|---|
| 6,078,647 A | * | 6/2000 | D'Eietto | H04L 12/2856 379/139 |
| 8,270,579 B2 | * | 9/2012 | Kung | H04M 15/62 379/14.01 |

(Continued)

OTHER PUBLICATIONS

Sato et al., "InfoBilling BrobCom, A Billing and Payment Platform for VoIP and Data Services," NTT Technical Journal, Jan. 2003, pp. 70-73, 9 pages (with English Translation).

*Primary Examiner* — Quoc D Tran
(74) *Attorney, Agent, or Firm* — Fish & Richardson P.C.

(57) ABSTRACT

Provided are an apparatus failure influence range recognition apparatus, an apparatus failure influence range recognition method, and a program capable of billing for a proper call charge for a call suspected of non-provision of a service. An apparatus failure influence range recognition apparatus includes a reception unit configured to receive apparatus failure information which is failure information of an element constituting a network, user information which is information regarding a user of a service, and call details information of an IP telephone, and a calculation unit configured to calculate, by linking the apparatus failure information, the user information, and the call details information with each other, a subtracted call charge with respect to a call charge for a suspected call influenced by an apparatus failure.

12 Claims, 16 Drawing Sheets

(56) References Cited

U.S. PATENT DOCUMENTS

| | | | |
|---|---|---|---|
| 10,531,515 B1* | 1/2020 | Engelhart | H04M 15/785 |
| 2004/0023655 A1* | 2/2004 | Hoy | H04M 3/36 |
| | | | 455/445 |

* cited by examiner

| IP TELEPHONE INDIVIDUAL TYPE | | | |
|---|---|---|---|
| | | IP TELEPHONE CORPORATION TYPE – PLAN 1 | IP TELEPHONE CORPORATION TYPE – PLAN 2 |
| IN SAME SERVICE | | | |
| VOICE – INTRA-PREFECTURE | (A COMPANY) | 8 YEN/180 SECONDS | /180 SECONDS |
| VOICE – INTER-PREFECTURE | (A COMPANY/B COMPANY) | 8 YEN/180 SECONDS | /180 SECONDS |
| TV TELEPHONE – INTRA-PREFECTURE/INTER-PREFECTURE | (A COMPANY/B COMPANY) | 8 YEN/180 SECONDS | /180 SECONDS |
| FOR PSTN | | | |
| VOICE – INTRA-PREFECTURE | (A COMPANY) | 8 YEN/180 SECONDS | /180 SECONDS |
| VOICE – INTER-PREFECTURE | (A COMPANY/B COMPANY) | 8 YEN/180 SECONDS | /180 SECONDS |
| VOICE – INTRA-PREFECTURE/INTER-PREFECTURE | (C COMPANY) | 8 YEN/180 SECONDS | /180 SECONDS |
| VOICE – INTRA-PREFECTURE/INTER-PREFECTURE | (D COMPANY) | 8 YEN/180 SECONDS | /180 SECONDS |
| FOR PHS | | | |
| INTRA-AREA | (ANY) | 10 YEN/60 SECONDS + 10 YEN | /60 SECONDS + 10 YEN |
| ~ 160 km | (ANY) | 10 YEN/45 SECONDS + 10 YEN | /45 SECONDS + 10 YEN |
| 160 km ~ | (ANY) | 10 YEN/36 SECONDS + 10 YEN | /36 SECONDS + 10 YEN |
| FOR MOBILE PHONE | | | |
| | (E COMPANY) | 16 YEN/60 SECONDS | /60 SECONDS |
| | (F COMPANY/G COMPANY) | 17.5 YEN/60 SECONDS | /60 SECONDS |
| ... | | | |
| ... | | | |

Fig. 2

DEVICE FAILURE INFLUENCE RANGE GRASPING APPARATUS, DEVICE FAILURE INFLUENCE RANGE GRASPING METHOD, AND PROGRAM

CROSS-REFERENCE TO RELATED APPLICATIONS

This application is a National Stage application under 35 U.S.C. § 371 of International Application No. PCT/JP2019/015801, having an International Filing Date of Apr. 11, 2019, which claims priority to Japanese Application Serial No. 2018-076631, filed on Apr. 12, 2018. The disclosure of the prior application is considered part of the disclosure of this application, and is incorporated in its entirety into this application.

TECHNICAL FIELD

The present disclosure relates to an apparatus failure influence range recognition apparatus, an apparatus failure influence range recognition method, and a program capable of billing for a proper call charge.

BACKGROUND ART

It is desirable that a proper call charge corresponding to provision of a service of an IP telephone is charged and billed to a user accurately, promptly, and with fewer operations. A system has already been established that a call charge during a normal time is charged and billed accurately, promptly, and with fewer operations through systemization. Also, a system has already been established in which a call suspected of being abnormal in a C plane (a call in which an SIP session error is detected or a call encountering system switching in an SIP server) is excluded from a charging target.

CITATION LIST

Non Patent Literature

Non Patent Literature 1: NTT Technical Journal, Issue 1, 2003, p70 to p73, "Charging and Payment Platform for VoIP and Data. Services", Internet <http://www.ntt.co.jp/journal/0301/filesjn200301070.pdf>, searched on Mar. 30, 2018

SUMMARY OF THE INVENTION

Technical Problem

However, there is no system of detecting a call in which a control plane (C plane) is normal but a user plane (U plane) is suspected of being abnormal, therefore billing data that is manually calculated with a declaration from a service user as a trigger is subtracted in a billing system. In other words, at present, regarding a call suspected of non-provision of a service, none of accuracy, promptness, and fewer operations are reached.

The present disclosure has been made in light of the related art, and an object of the present disclosure is to provide an apparatus failure influence range recognition apparatus, an apparatus failure influence range recognition method, and a program capable of achieving proper billing for a call charge for a call suspected of non-provision of a service.

Means for Solving the Problem

In order to achieve the object, according to the disclosure related to a first aspect, there is provided an apparatus failure influence range recognition apparatus including a reception unit configured to receive apparatus failure information which is failure information of an element constituting a network, user information which is information regarding a user of a service, and call details information of an IP telephone; and a calculation unit configured to calculate, by linking the apparatus failure information, the user information, and the call details information with each other, a subtracted call charge with respect to a call charge for a suspected call influenced by an apparatus failure.

According to the disclosure related to a second aspect, in the disclosure related to the first aspect, in a case where a service-influencing failure which is a failure influencing a voice quality of an IP telephone service occurs, the calculation unit extracts the call details information of a call charge subtraction target based on the apparatus failure information and the user information, computes a call charge based on the extracted call details information, and calculates a subtracted call charge for each billing ID.

According to the disclosure related to a third aspect, in the disclosure related to the second aspect, the calculation unit extracts call information that overlaps with a period between time of occurrence of the service-influencing failure and time of recovery from the service-influencing failure, and then extracts call information in which a service is influenced based on a calling telephone number or number range pair information.

According to the disclosure related to a fourth aspect, in the disclosure related to the third aspect, in a case where the service-influencing failure occurs due to a failure in a relay router, the calculation unit extracts each piece of number range information from telephone number information of the call details information to create a calling/called number range pair, and collates the created calling/called number range pair with a "call influencing calling/called number range pair" registered in advance for each apparatus to create call details information of a call charge subtraction target.

According to the disclosure related to a fifth aspect, in the disclosure related to any one of the first to fourth aspects, the calculation unit calculates a subtracted call charge with respect to a call in which a C plane is normal, and a U plane is suspected of being abnormal.

According to the disclosure related to a sixth aspect, there is provided an apparatus failure influence range recognition method of causing a computer to execute receiving apparatus failure information which is failure information of an element constituting a network, user information which is information regarding a user of a service, and call details information of an IP telephone; and calculating, by linking the apparatus failure information, the user information, and the call details information with each other, a subtracted call charge with respect to a call charge for a suspected call influenced by an apparatus failure.

According to the disclosure related to a seventh aspect, there is provided a program causing a computer to execute receiving apparatus failure information which is failure information of an element constituting a network, user information which is information regarding a user of a service; and call details information of an IP telephone; and calculating, by linking the apparatus failure information, the user information, and the call details information with each other, a subtracted call charge with respect to a call charge for a suspected call influenced by an apparatus failure.

Effects of the Invention

According to the present disclosure, it is possible to provide an apparatus failure influence range recognition apparatus, an apparatus failure influence range recognition method, and a program capable of achieving proper billing for a call charge for a call suspected of non-provision of a service.

BRIEF DESCRIPTION OF DRAWINGS

FIG. 2 is a diagram illustrating an example of a call charge tariff.

DESCRIPTION OF EMBODIMENTS

Hereinafter, an embodiment of the present disclosure will be described with reference to the drawings. Throughout the drawings, identical or similar portions are given identical or similar reference signs and numerals.

Related Art 1

Figure 1:
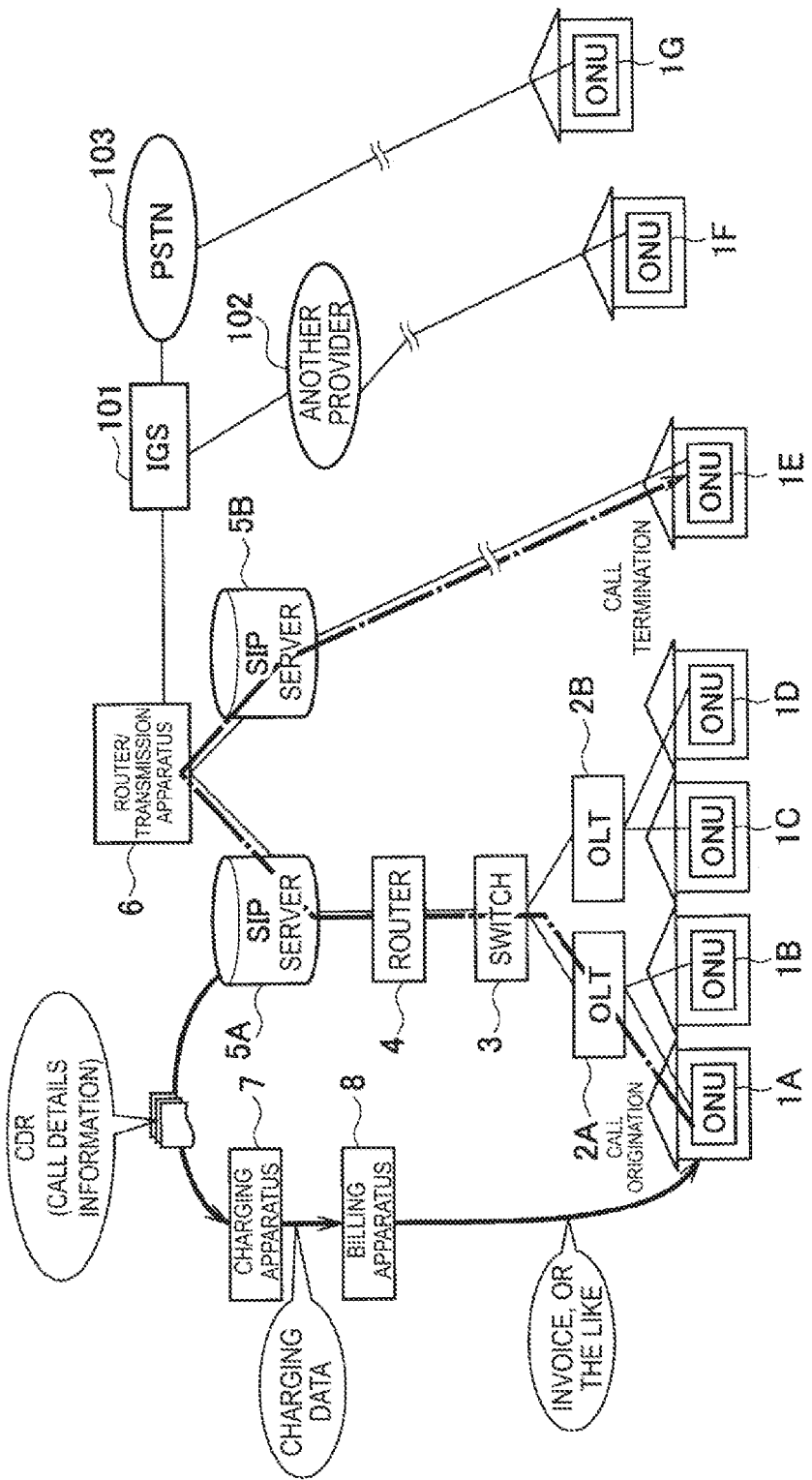
FIG. 1 is a diagram for describing the related art 1.

FIG. 1 is a diagram for describing the related art 1. Here, a description will be made of a flow of a billing for a call charge for an IP telephone. Herein, a communication path such as an ONU 1A→an OLT 2A→a switch 3→a router 4→an SIP server 5A→a router/transmission apparatus 6→an SIP server 5B→ . . . →and ONU 1E is exemplified. In this case, a CDR is sent from the SIP server 5A to a charging apparatus 7, charging data is sent from the charging apparatus 7 to a billing apparatus 8, and an invoice, or the like is sent from the billing apparatus 8 to a calling side user.

The charging apparatus 7 specifies a tariff on the basis of information such as a "communication type", a "provider code", and a "call time period" obtained from a Call Detail Record (CDR; call details information) generated by the SIP server 5A accommodating the calling side user, and computes a call charge for an IP telephone to be billed to the calling side user. The CDR includes a calling telephone number, a called telephone number, a communication type, speech start date and time, speech end date and time, a call origination provider code, a relay provider code, and a call termination provider code. The charging apparatus 7 performs charging processing for a call charge on the basis of the CDR. The charging apparatus 7 determines a distance, a call time period, and a time frame in addition to the information included in the CDR, specifies a tariff to be applied by combining the determination result with a service type or a charge plan derived from user information, and calculates a call charge per one call by multiplying a unit price per unit time by a frequency (obtained by using the call time period).

In the following description, in some cases, the switch 3 will be referred to as an accommodation switch, the router 4 will be referred to as an accommodation router, and the router of the "router/transmission apparatus 6" will be referred to as a relay router. The accommodation router recognizes each user, but the relay router is a router that relays at a core portion of a network, and hence does not recognize each user (which will be described below).

An interconnection gateway switch (IGS) 101 is a gateway switch that connects a public switched telephone network (PSTN) 103 to other networks. The IGS 101 is provided to clarify a charge settlement and sharing of maintenance responsibilities with another provider 102.

Specifying of Tariff to be Applied

FIG. 2 is a diagram illustrating an example of a call charge tariff. The tariff is a charge table. In a call charge for an IP telephone, the tariff shows a call charge unit price per unit time (180 seconds, 60 seconds, 45 seconds, or 36 seconds) applied in a case of matching conditions such as a service type, a charge plan, a communication type, a connection destination provider, and a distance.

Herein, three tariffs in which service types are different from each other are exemplified. A call charge unit price is set for each communication type. A call charge unit price may be separately set for each time frame of a call in terms of system (for example, midnight discount). In addition, there are special tariffs corresponding to various discount services or charge plans, international call tariffs set for respective countries, company-based relative discount tariffs, and the like, and a proper tariff is applied for each CDR.

Related Art 2

Figure 3:
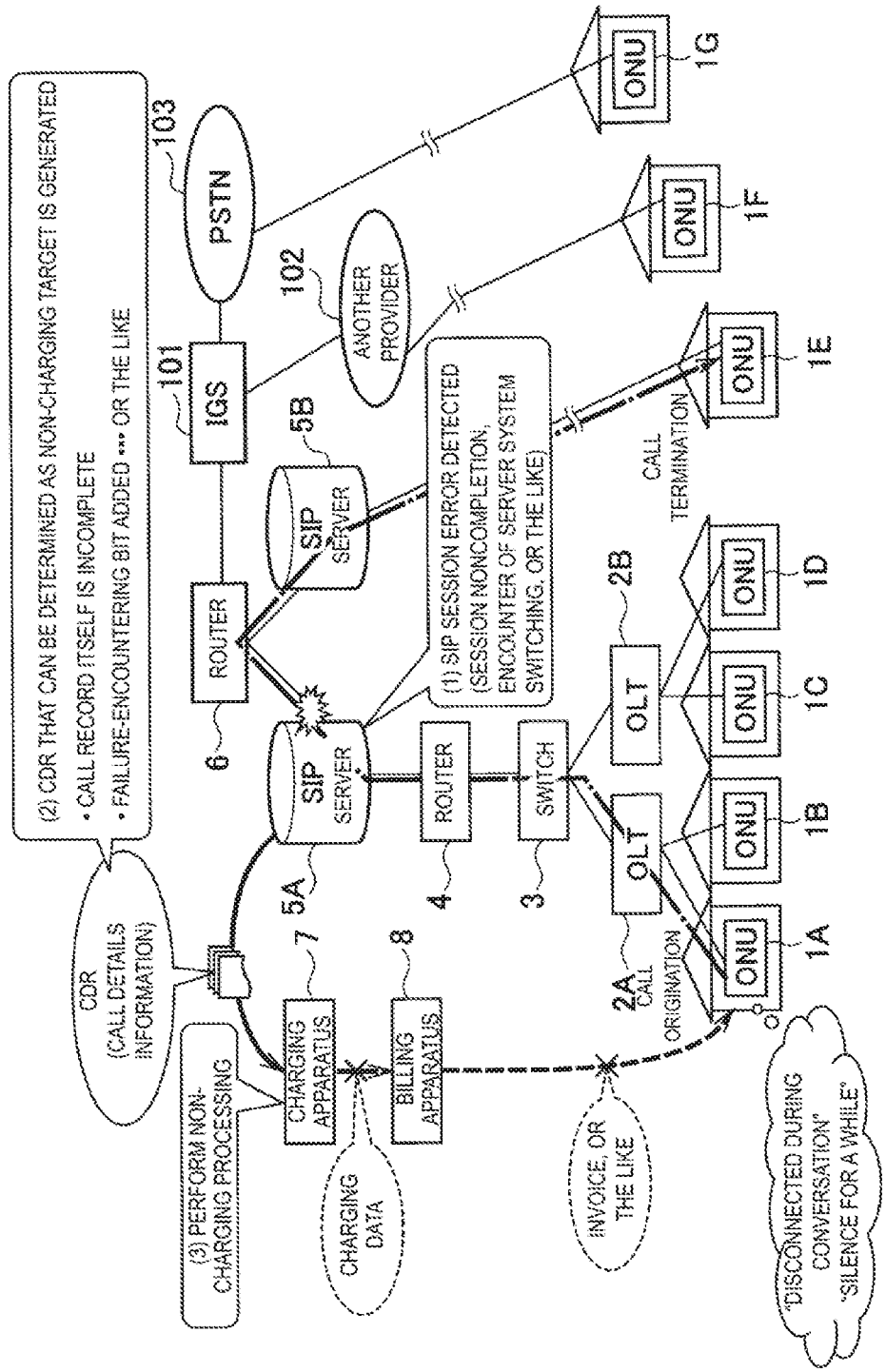
FIG. 3 is a diagram for describing the related art 2.

FIG. 3 is a diagram for describing the related art 2. In a case where error is detected in an SIP session of a certain call due to a failure in the SIP server 5A or an apparatus on a communication path, the call is handled as an "uncompleted call" or a "call encountering a failure" such that non-charging processing is performed by the charging apparatus 7, and thus a call charge is not charged or billed.

Specifically, as illustrated in FIG. 3, first, it is assumed that SIP session error (session noncompletion, encounter of server system switching, or the like) is detected in the SIP server 5A. In this case, a CDR from which a non-charging target can be determined is generated by the SIP server 5A. For example, the CDR whose call record itself is incomplete, or the CDR added with a failure-encountering call bit is generated. Consequently, non-charging processing is performed by the charging apparatus 7.

Problems in Related Art

Figure 4:
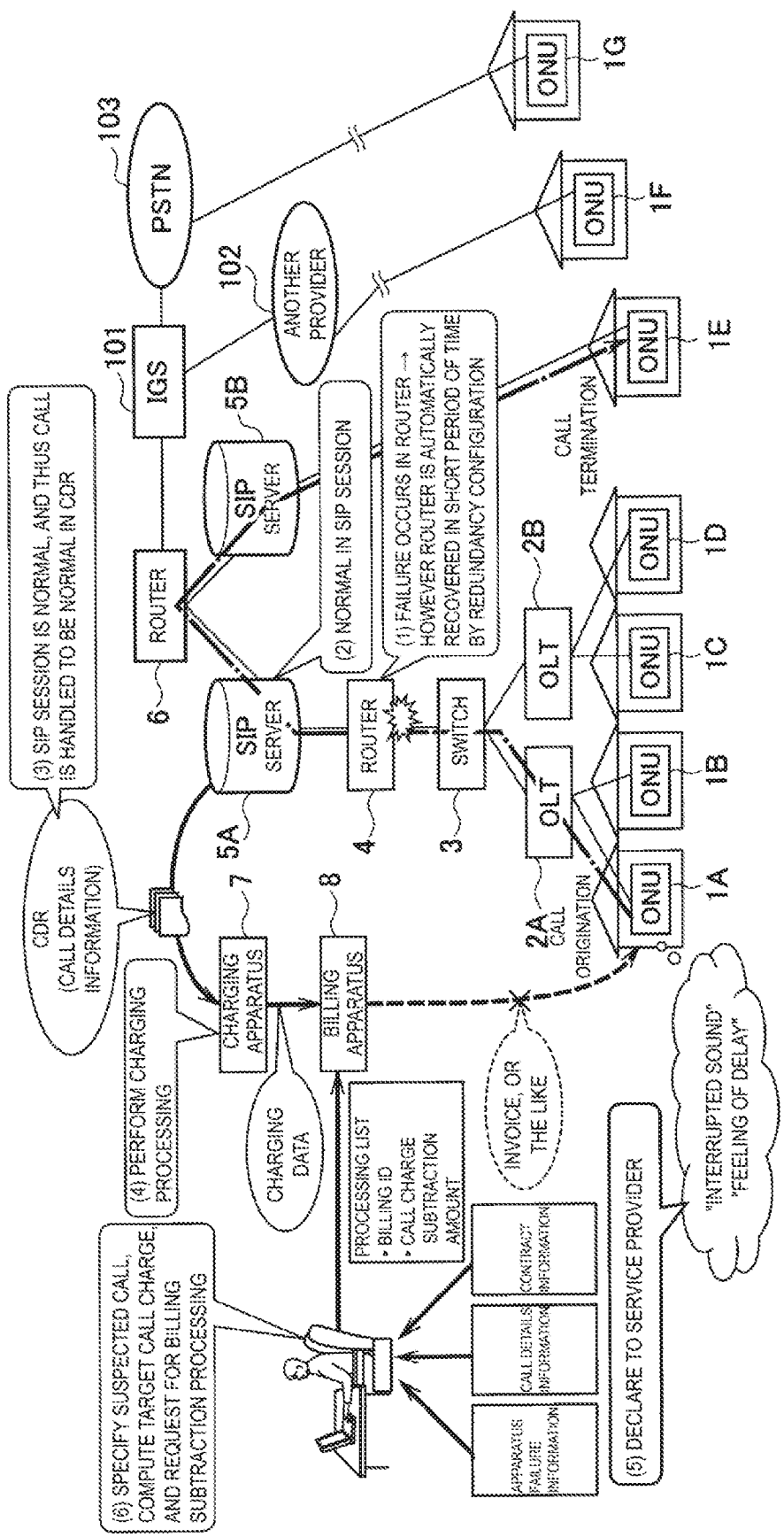
FIG. 4 is a diagram for describing problems in the related art 1 and the related art 2.

FIG. 4 is a diagram for describing problems in the related art 1 and the related art 2. According to the related art 1 and the related art 2, for example, in a case where automatic recovery due to a failure occurring in an apparatus on a communication path is performed in a short period of time, error in a session managed by the SIP server 5A may not be detected. Thus, a call quality may be influenced, but a call charge is billed to a calling side user.

Specifically, as illustrated in FIG. 4, it is assumed that a failure occurs in the router 4, but the router 4 is automatically recovered in a short period of time by a redundancy configuration, or the like. In this case, an SIP session managed by the SIP server 5A is normal, and thus a call is handled to be normal in a CDR. Thus, charging processing is performed by the charging apparatus 7. Thereafter, when a user declares "interrupted sound" or "feeling of delay", a service provider receiving the declaration performs examination from that time to specify a suspected call, and computes a target call charge, and the billing apparatus 8 performs billing subtraction processing.

Present Embodiment

Figure 5:
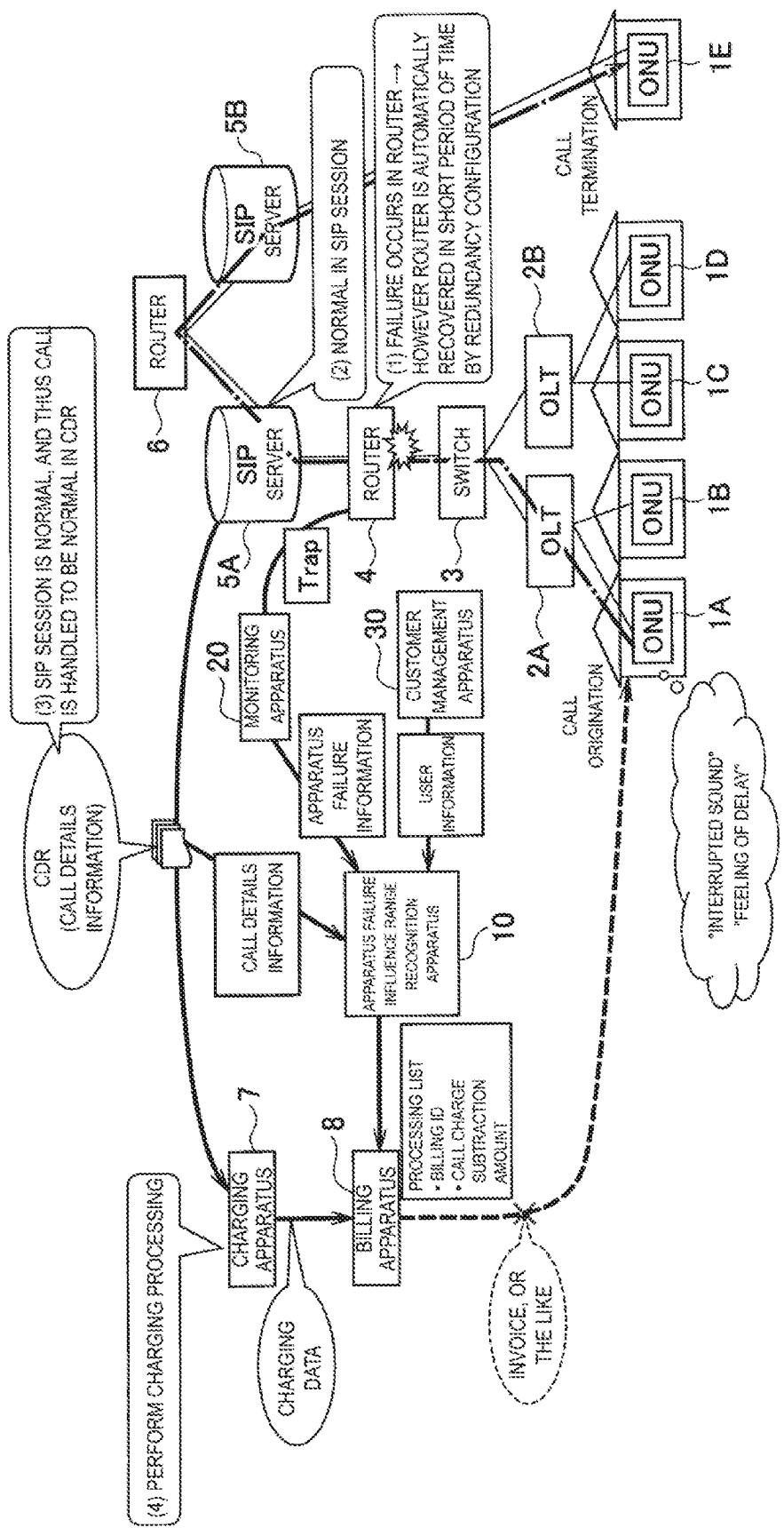
FIG. 5 is a diagram illustrating a configuration of a call charge billing system of the present embodiment.

FIG. 5 is a diagram illustrating a configuration of a call charge billing system of the present embodiment. In the call charge billing system, apparatus failure information of a facility side and user information of a service side are linked systematically to a CDR. Consequently, even in a case where there is no declaration from a user, automatic subtraction processing for a call charge for a suspected call influenced by an apparatus failure is possible.

Specifically, as illustrated in FIG. 5, it is assumed that a failure occurs in the router 4, but the router 4 is automatically recovered in a short period of time by a redundancy configuration. In this case, an SIP session managed by the SIP server 5A is normal, and thus a call is handled to be normal in a CDR. Thus, charging processing is performed by the charging apparatus 7. Consequently, in the present embodiment, an apparatus failure influence range recognition apparatus 10 having a call charge optimization function acquires apparatus failure information from a monitoring apparatus 20, acquires user information from a customer management apparatus 30, acquires a CDR from the SIP server 5A, generates a processing list (including a billing ID and a call charge subtraction amount) by using these information, and causes the billing apparatus 8 cooperatively to perform billing subtraction processing.

The monitoring apparatus 20 is a facility system (network system) apparatus monitoring elements constituting a network, such as the SIP server 5A, the router 4, and the switch 3. For example, monitored apparatuses are monitored by using an SNMP trap, a Management Information Base (MIB), or the like.

The customer management apparatus 30 is a service system (business system) apparatus managing information regarding a customer (user). Generally, the customer management apparatus 30 is separated from the network.

Apparatus Failure Influence Range Recognition Apparatus

Figure 6:
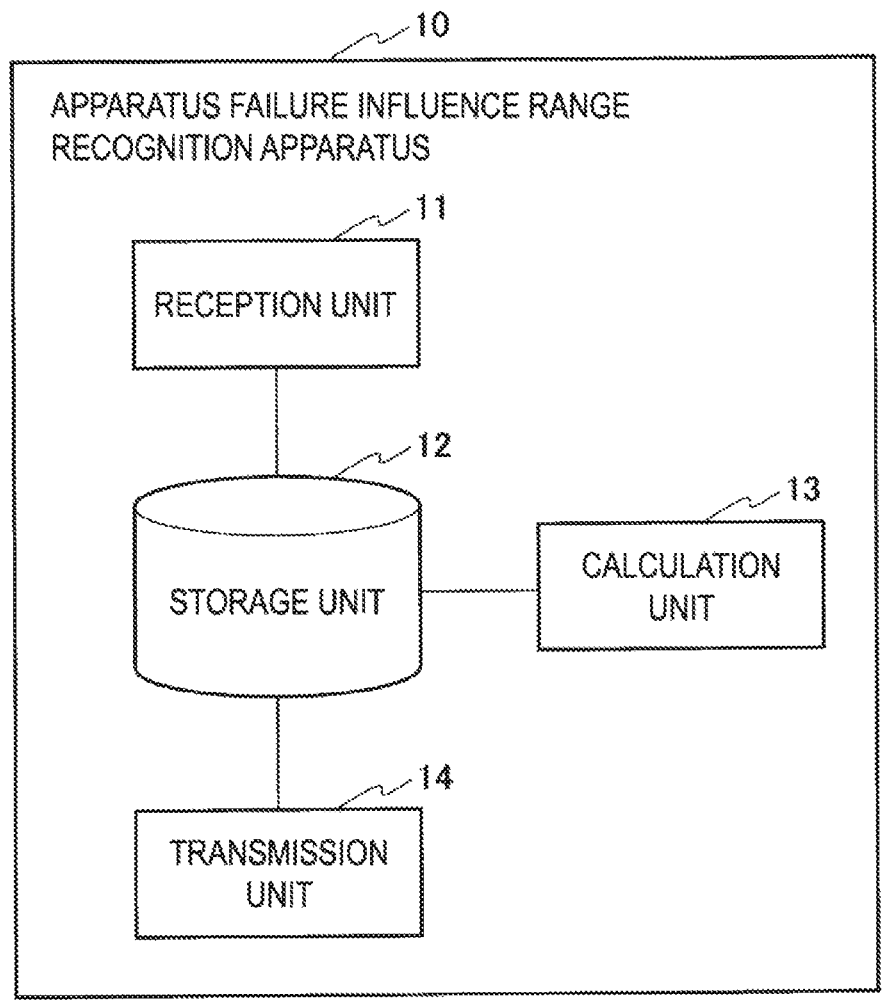
FIG. 6 is a functional block diagram illustrating an apparatus failure influence range recognition apparatus of the present embodiment.

FIG. 6 is a functional block diagram illustrating the apparatus failure influence range recognition apparatus 10 of the present embodiment. The apparatus failure influence range recognition apparatus 10 links apparatus failure information, user information, a CDR with each other to specify a call to be excluded from a charging target, and achieves proper billing for a call charge for a call suspected of non-provision of a service by linking a specified result to processing in the charging system.

Specifically, as illustrated in FIG. 6, the apparatus failure influence range recognition apparatus 10 includes a reception unit 11, a storage unit 12, a calculation unit 13, and a transmission unit 14. The reception unit 11 receives various pieces of information such as apparatus failure information, user information, and call details information. The apparatus failure information is failure information (facility data) of an element constituting the network. The user information is information (customer data) regarding a user of a service. The call details information is call details data (CDR) for an IP telephone. The storage unit 12 stores the various pieces of information such as the apparatus failure information, the user information, and the call details information received by the reception unit 11. The calculation unit 13 calculates a subtracted call charge by using the various pieces of information such as the apparatus failure information, the user information, and the call details information stored in the storage unit 12. The transmission unit 14 transmits various pieces of information such as the subtracted call charge calculated by the calculation unit 13 to an external apparatus such as the charging apparatus 7 or the billing apparatus 8.

In the related art, with respect to a call in which a C plane is normal, and a U plane is suspected of being abnormal, there is no system of automatically excluding the call from a charging target, and a billing system performs subtraction processing on billing data that is manually calculated only in a case where there is a declaration from a service user, and thus accuracy and promptness deteriorate. In the present embodiment, a call to be excluded from a charging target is specified by linking facility data, customer data, and call details data with each other, and a result is linked to processing in the charging system, so that the problem of the related art can be solved.

In a case where a series of processing performed by the apparatus failure influence range recognition apparatus 10 is executed by software, a program configuring the software is installed on a computer. In the computer, a Central Processing Unit (CPU), a Read Only Memory (ROM), and a Random Access Memory (RAM) are connected to each other via a bus. The bus is further connected to an input/output interface. The input/output interface is connected to an input unit such as a keyboard or a mouse and an output unit such as a display or a speaker.

Outline of Operation Logic Example of Automatic Subtraction Processing

Figure 7:
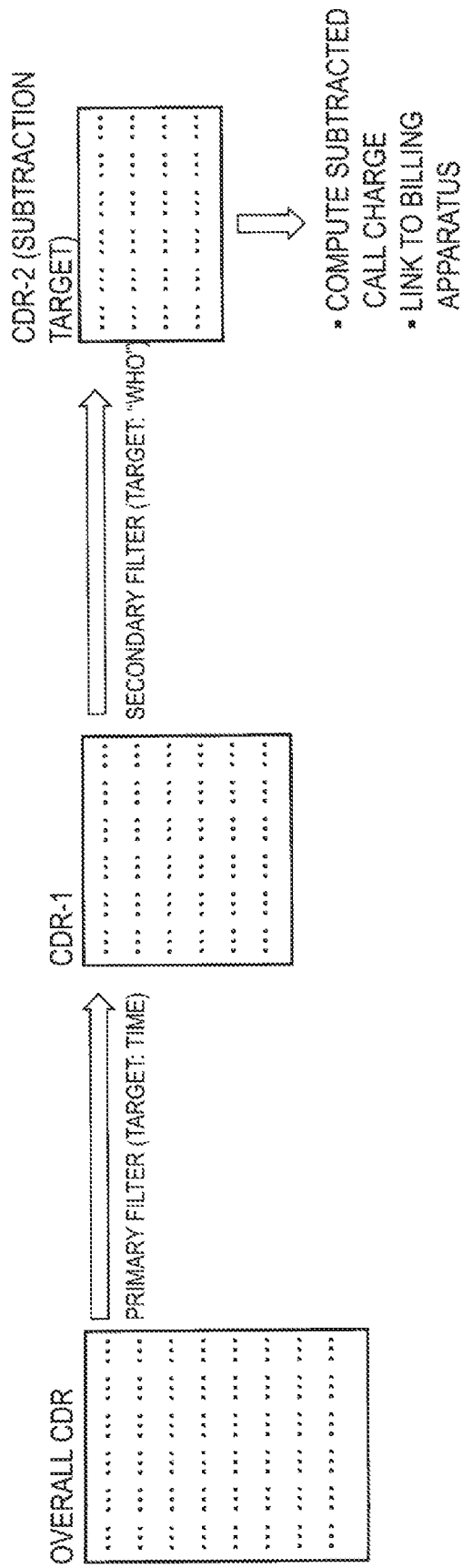
FIG. 7 is a diagram for describing an outline of an operation logic example of automatic subtraction processing in the apparatus failure influence range recognition apparatus of the present embodiment.

FIG. 7 is a diagram for describing an outline of an operation logic example of automatic subtraction processing in the apparatus failure influence range recognition apparatus 10 of the present embodiment. Here, a case where a failure occurs in the accommodation router or the accommodation switch is supposed. Consequently, in a case where a failure (hereinafter, referred to as a service-influencing failure) influencing a voice quality of an IP telephone service occurs, a CDR of a call charge subtraction target is extracted on the basis of the apparatus failure information and the user information, and then a call charge is computed on the basis of the extracted CDR, and, finally, a subtracted call charge for each billing ID is calculated and linked to the billing apparatus 8 to achieve billing subtraction processing.

Specifically, as illustrated in FIG. 7, primary filter processing (target: time) is performed on the overall CDR, and thus call information that overlaps with a period between time of the occurrence of the service-influencing failure and time of recovery from the failure is extracted. Secondary filter processing (target: "who") is performed on a CDR-1 extracted in the above-described way, and call information in which a service is regarded to be influenced is extracted on the basis of a calling telephone number or number range pair information. A subtracted call charge is computed on the basis of a CDR-2 (subtraction target) extracted in the above-described way, and linked to the billing apparatus 8 to achieve billing subtraction processing.

The above processing as one sequence, billing subtraction processing is executed for each service-influencing failure. The processing may be executed whenever a failure occurs, may be executed every day, or may be executed every month.

Details 1 of Operation Logic Example of Automatic Subtraction Processing

Figure 8:
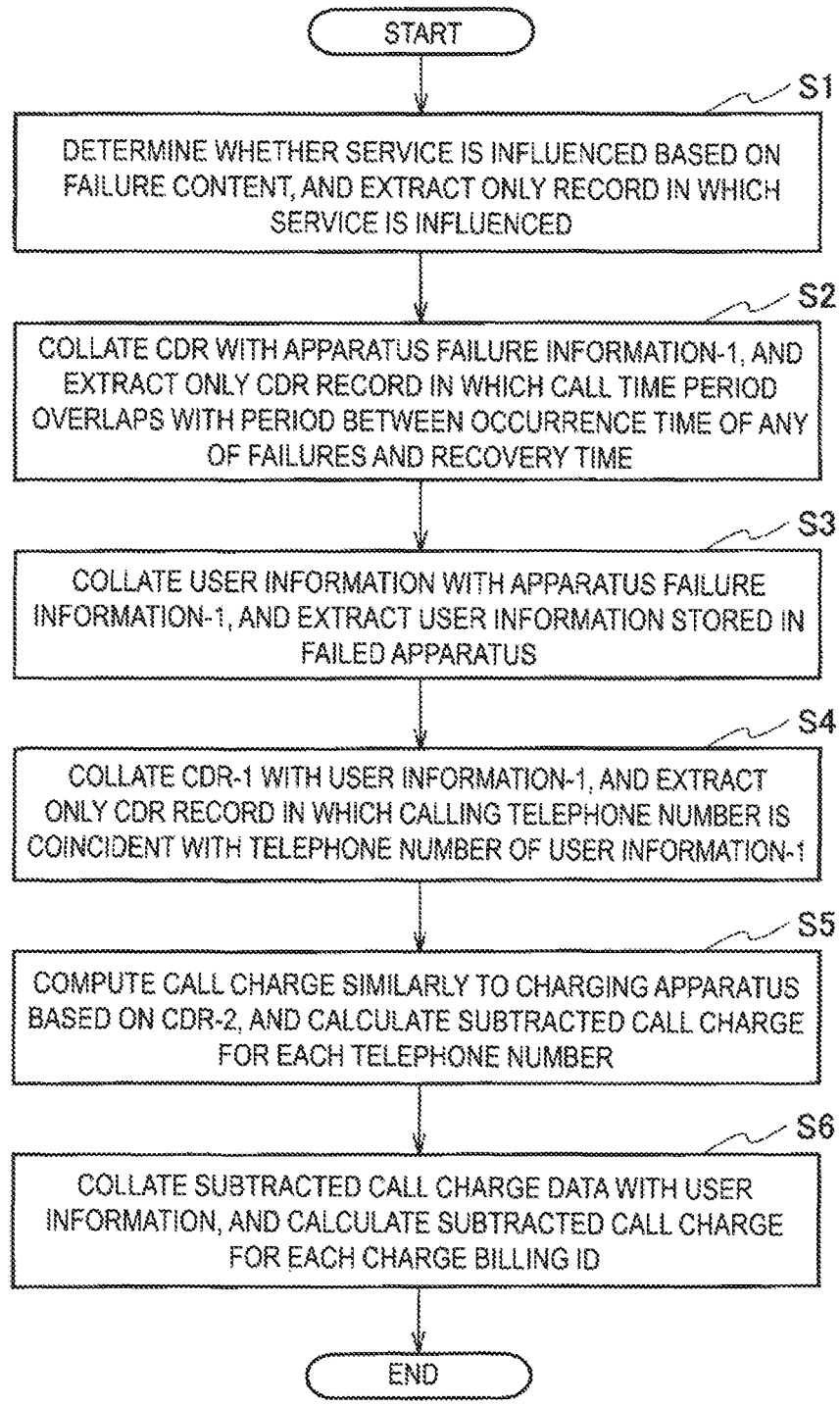
FIG. 8 is a flowchart illustrating the operation logic example of the automatic subtraction processing in the apparatus failure influence range recognition apparatus of the present embodiment.

FIG. 8 is a flowchart illustrating the operation logic example of the automatic subtraction processing in the apparatus failure influence range recognition apparatus 10 of the present embodiment, and FIG. 9 to FIG. 14 are diagrams for describing the flowchart. Hereinafter, with reference to FIG. 8 to FIG. 14, a description will be made of an operation logic example in a case where a failure occurs in the accommodation router or the accommodation switch.

Figure 9:
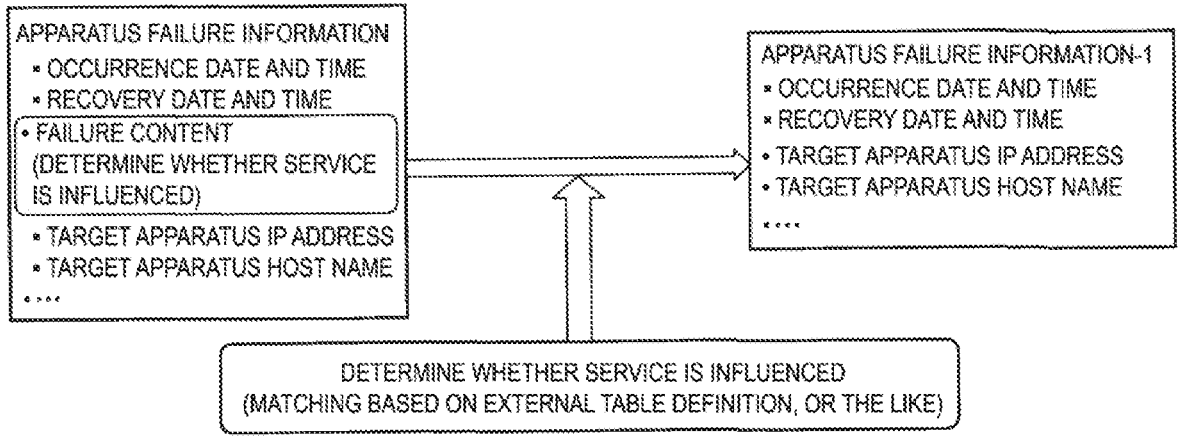
FIG. 9 is a diagram for describing step S1 in the flowchart of FIG. 8.

First, as illustrated in FIG. 9, the apparatus failure influence range recognition apparatus 10 determines whether a service is influenced on the basis of failure contents included in the apparatus failure information, and extracts only a record in which the service is influenced (step S1 in FIG. 8). Matching based on an external table definition, or the like may be used to determine whether the service is influenced. Consequently, service-influencing apparatus failure information-1 is extracted.

Figure 10:
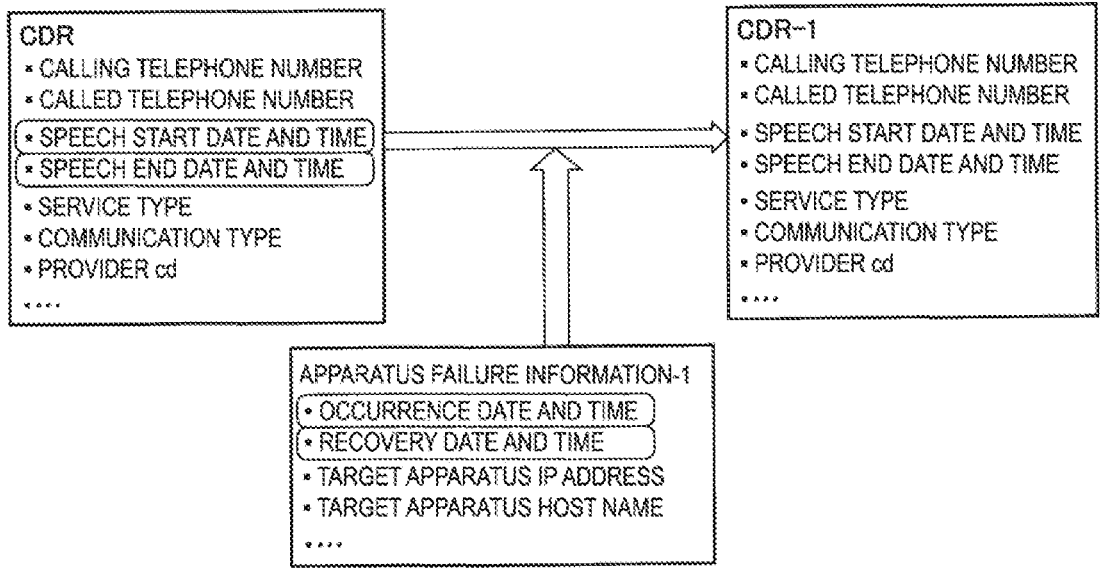
FIG. 10 is a diagram for describing step S2 in the flowchart of FIG. 8.

Next, as illustrated in FIG. 10, the apparatus failure influence range recognition apparatus 10 collates a CDR with the apparatus failure information-1, and thus extracts only a CDR record in which a call time period overlaps with a period between time of the occurrence of any failure and time of the recovery from the failure (step S2 in FIG. 8). Consequently, a CDR-1 from which a call may be suspected in terms of call time period is extracted. However, the CDR at this time is subjected to filtering related to time, and thus also includes call information not related to a failed apparatus (that is, a call charge is not required to be subtracted).

Figure 11:
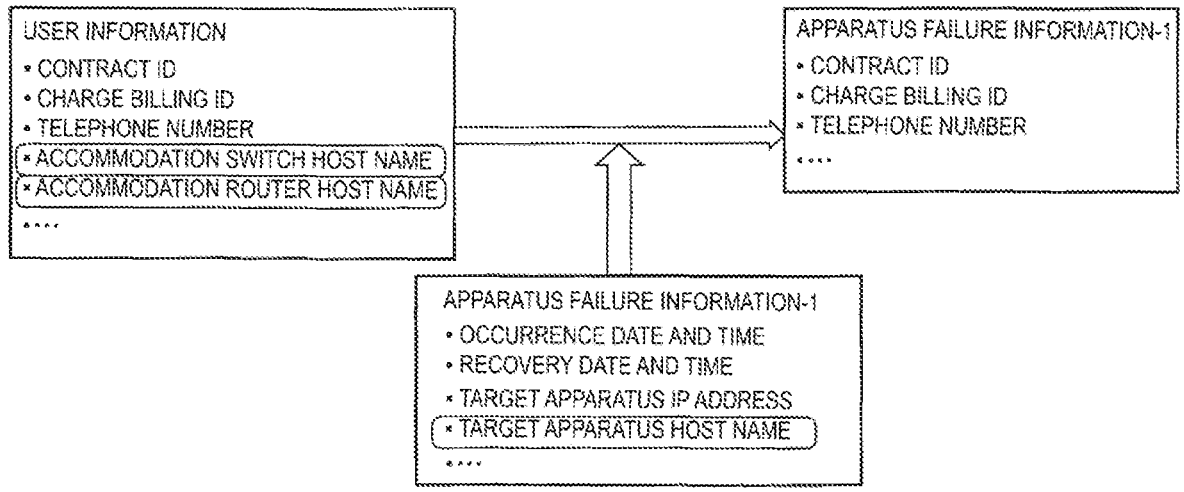
FIG. 11 is a diagram for describing step S3 in the flowchart of FIG. 8.

Next, as illustrated in FIG. 11, the apparatus failure influence range recognition apparatus 10 collates user information with the apparatus failure information-1, and thus extracts user information stored in the failed apparatus (step S3 in FIG. 8). In a case of a failure in the slot/port basis, the appropriateness of accommodation may be determined in the accommodation slot/port basis. Consequently, user information-1 that may encounter a suspected call is extracted.

Figure 12:
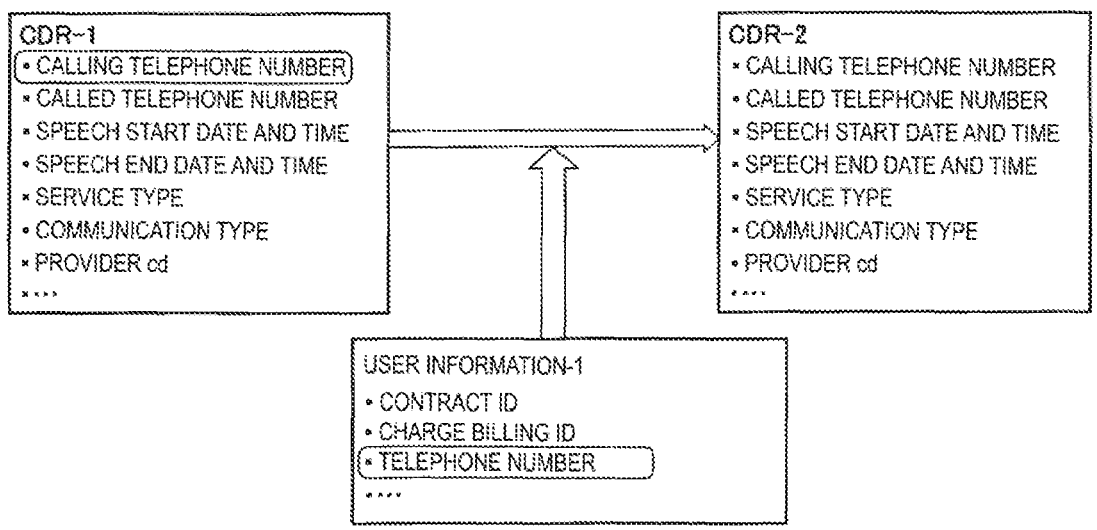
FIG. 12 is a diagram for describing step S4 in the flowchart of FIG. 8.

Next, as illustrated in FIG. 12, the apparatus failure influence range recognition apparatus 10 collates the CDR-1 with the user information-1, and thus extracts only a CDR record in which a calling telephone number is coincident with a telephone number of the user information-1 (step S4 in FIG. 8). Consequently, a CDR-2 regarding a call for which a call charge is subtracted is extracted.

Figure 13:
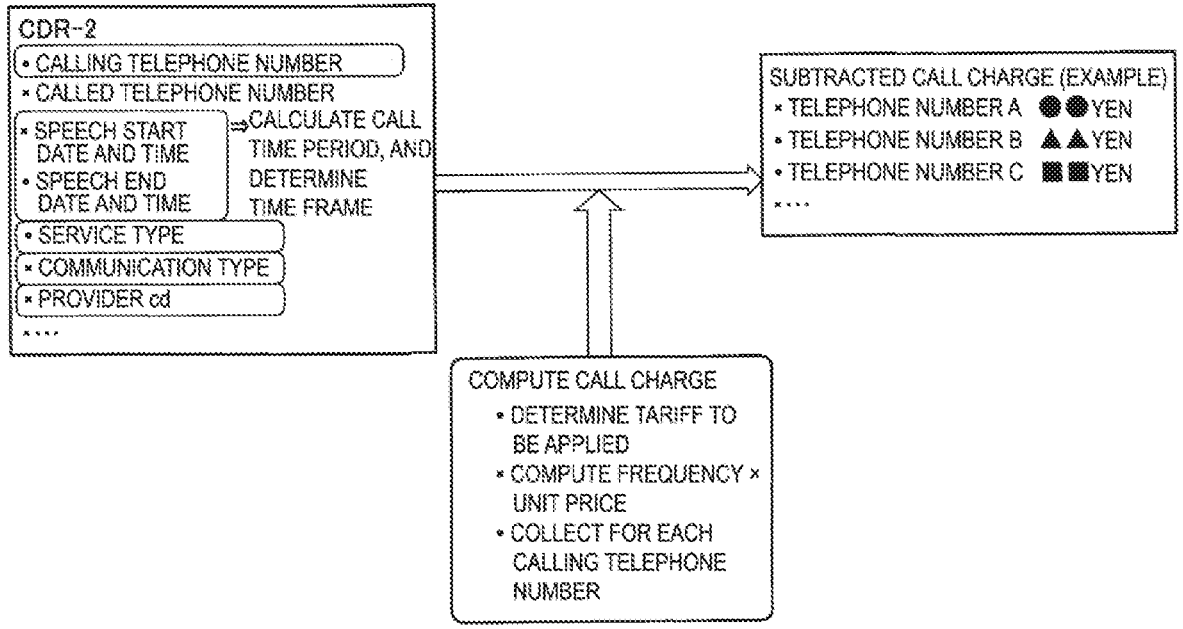
FIG. 13 is a diagram for describing step S5 in the flowchart of FIG. 8.

Next, as illustrated in FIG. 13, the apparatus failure influence range recognition apparatus 10 computes a call charge on the basis of the CDR-2 in the same manner as in the charging apparatus 7, and thus calculates a subtracted call charge for each telephone number (step S5 in FIG. 8). In the call charge computation, a tariff to be applied is determined, and a frequency×a unit price is computed for each calling telephone number. Consequently, the subtracted call charge (a telephone number basis) is calculated.

Figure 14:
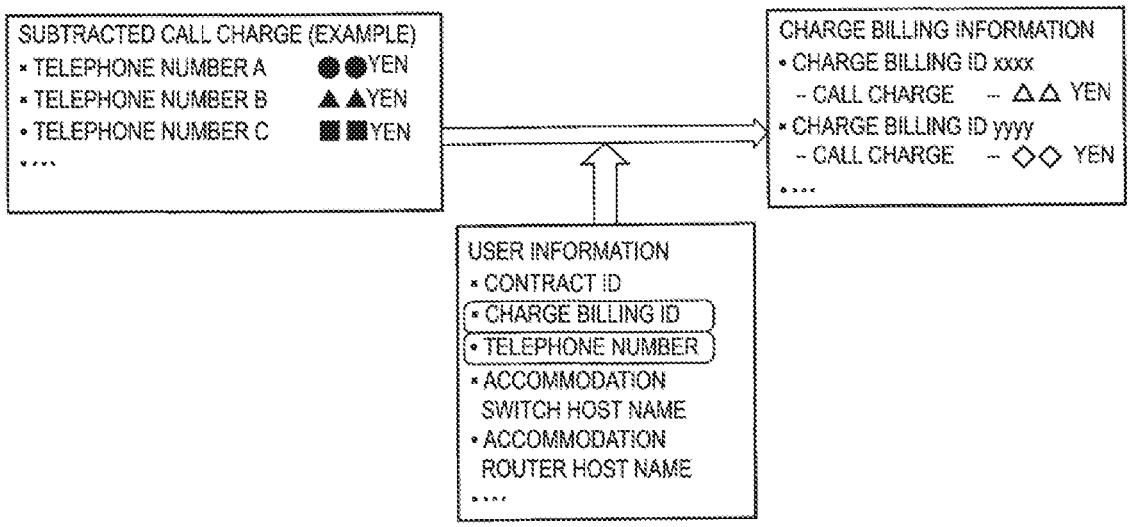
FIG. 14 is a diagram for describing step S6 in the flowchart of FIG. 8.

Finally, as illustrated in FIG. 14, the apparatus failure influence range recognition apparatus 10 collates the subtracted call charge data with the user information, and thus calculates a subtracted call charge for each charge billing ID (step S6 in FIG. 8). Consequently, the result described above is linked to the billing apparatus 8 and subtraction processing is performed by the billing apparatus 8.

Details 2 of Operation Logic Example of Automatic Subtraction Processing

Figure 15:
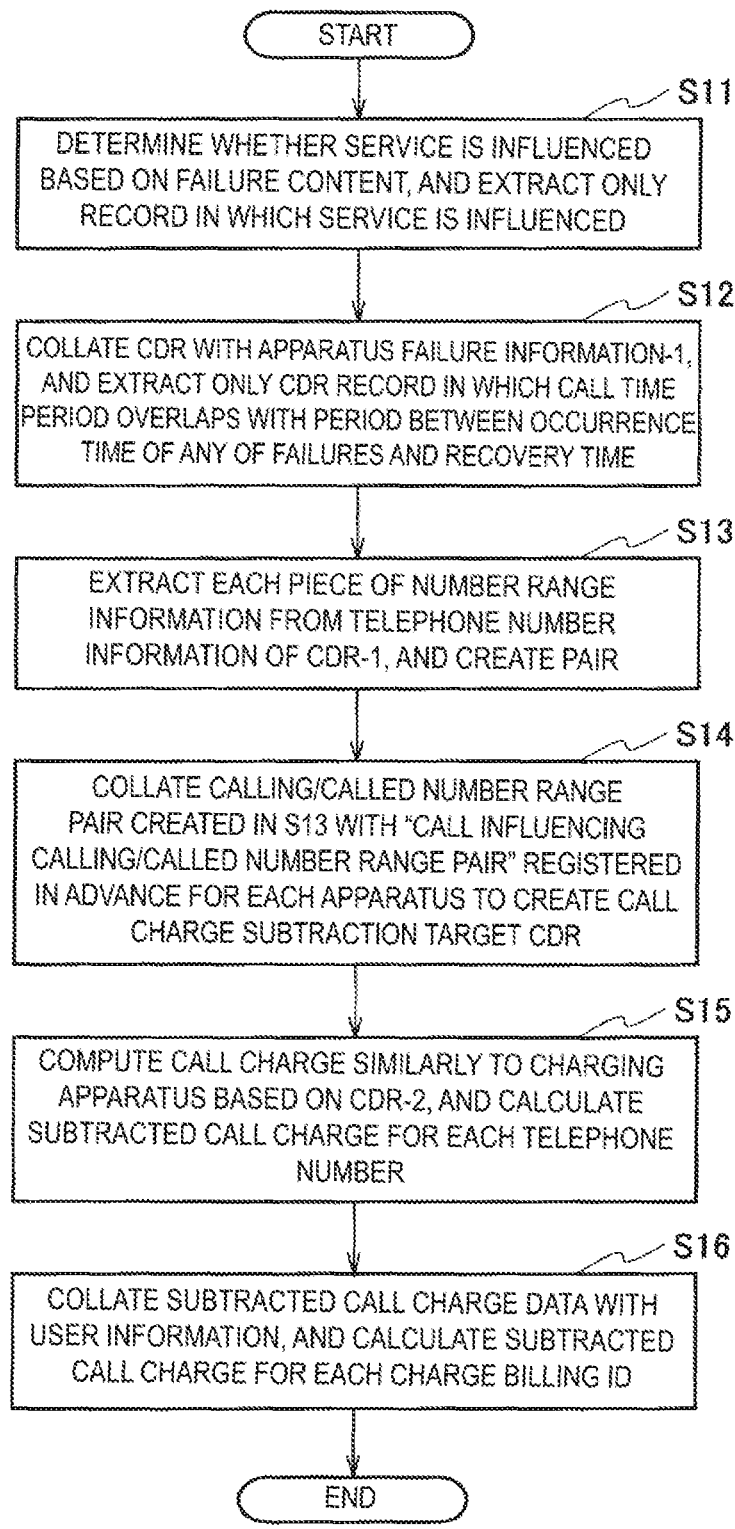
FIG. 15 is a flowchart illustrating the operation logic example of the automatic subtraction processing in the apparatus failure influence range recognition apparatus of the present embodiment.
Figure 16:
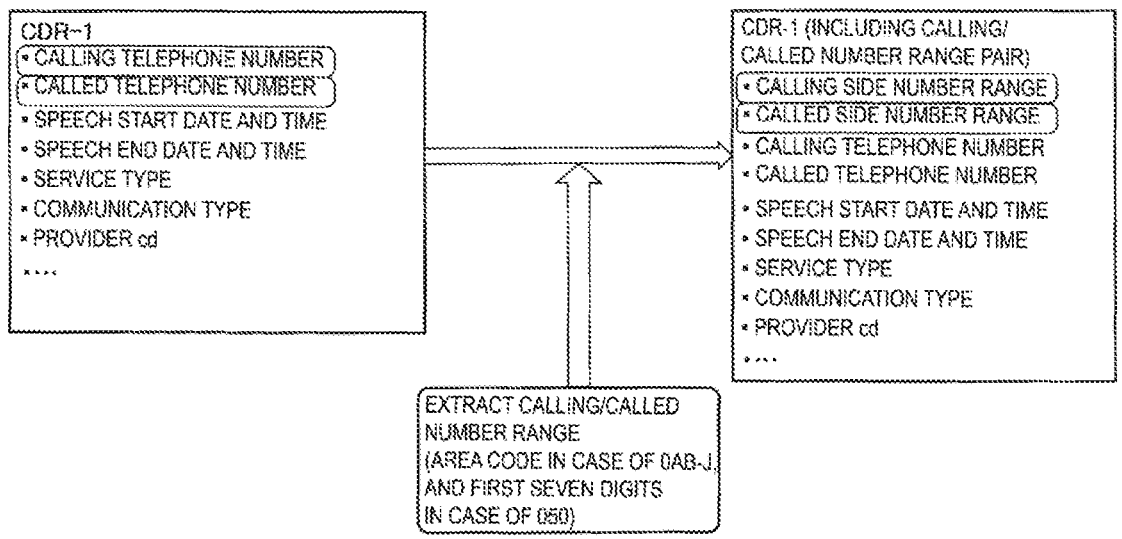
FIG. 16 is a diagram for describing step S13 in the flowchart of FIG. 15.
Figure 17:
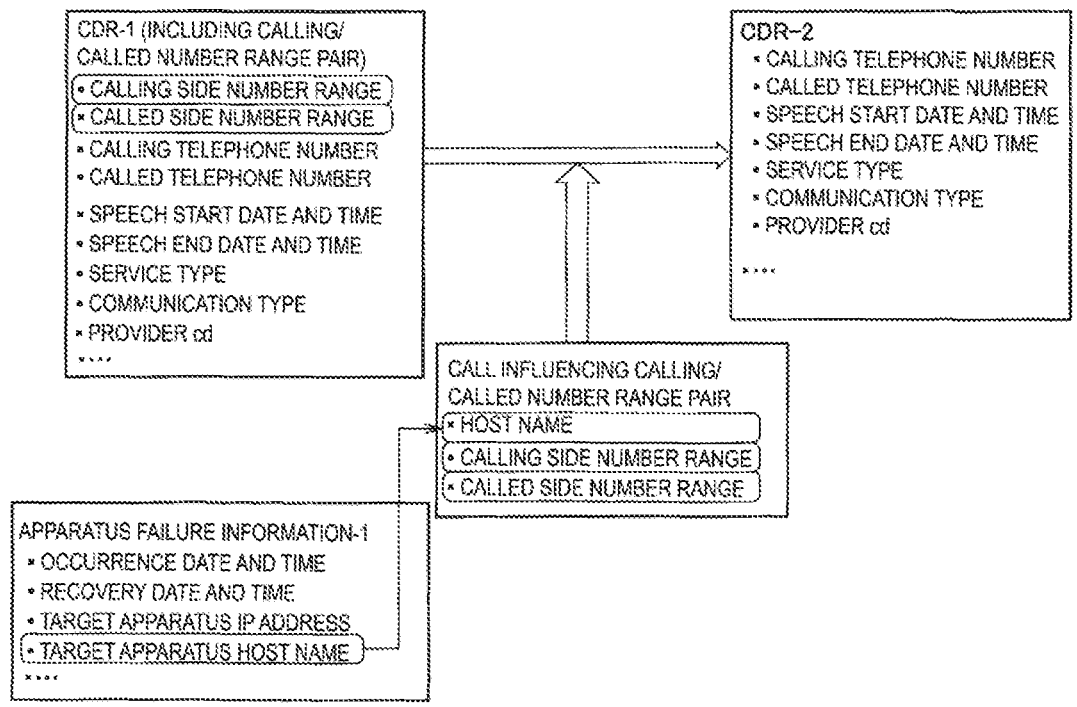
FIG. 17 is a diagram for describing step S14 in the flowchart of FIG. 15.

FIG. 15 is a flowchart illustrating the operation logic example of the automatic subtraction processing in the apparatus failure influence range recognition apparatus 10 of the present embodiment, and FIG. 16 and FIG. 17 are diagrams for describing the flowchart. Hereinafter, with reference to FIG. 15 to FIG. 17, a description will be made of an operation logic example in a case where a failure occurs in the relay router.

First, steps S11 and S12 in FIG. 15 are respectively the same as steps S1 and S2 in FIG. 8. As described above, the relay router does not recognize each user, and thus supplementary information is created as follows in a case where the relay router has failed.

In other words, as illustrated in FIG. 16, the apparatus failure influence range recognition apparatus 10 extracts information regarding each number range from the telephone number information in the CDR-1, and creates a pair of number ranges (step S13 in FIG. 15). Extraction of a calling/called number range may be performed by using an area code in a case of 0AB-J, and the first seven digits in a case of 050. Consequently, the CDR-1 (including the calling/called number range pair) is created.

Next, as illustrated in FIG. 17, the apparatus failure influence range recognition apparatus 10 collates the calling/called number range pair created in step S13 with a "call influencing calling/called number range pair" registered in advance for each apparatus, and creates a call charge subtraction target CDR (step S14 in FIG. 15). In other words, the relay router, when a failure occurs, can register information obtained by examining in advance the influence between a called number range and a calling number range. Consequently, the CDR-2 regarding the call for which a call charge is subtracted is created. In the CDR-2, the calling and called number ranges are no longer necessary.

Finally, steps S15 and S16 in FIG. 15 are respectively the same as steps S5 and S6 in FIG. 8. Consequently, the result described above is linked to the billing apparatus 8 and subtraction processing is performed by the billing apparatus 8.

MODIFICATION EXAMPLE 1

Figure 18:
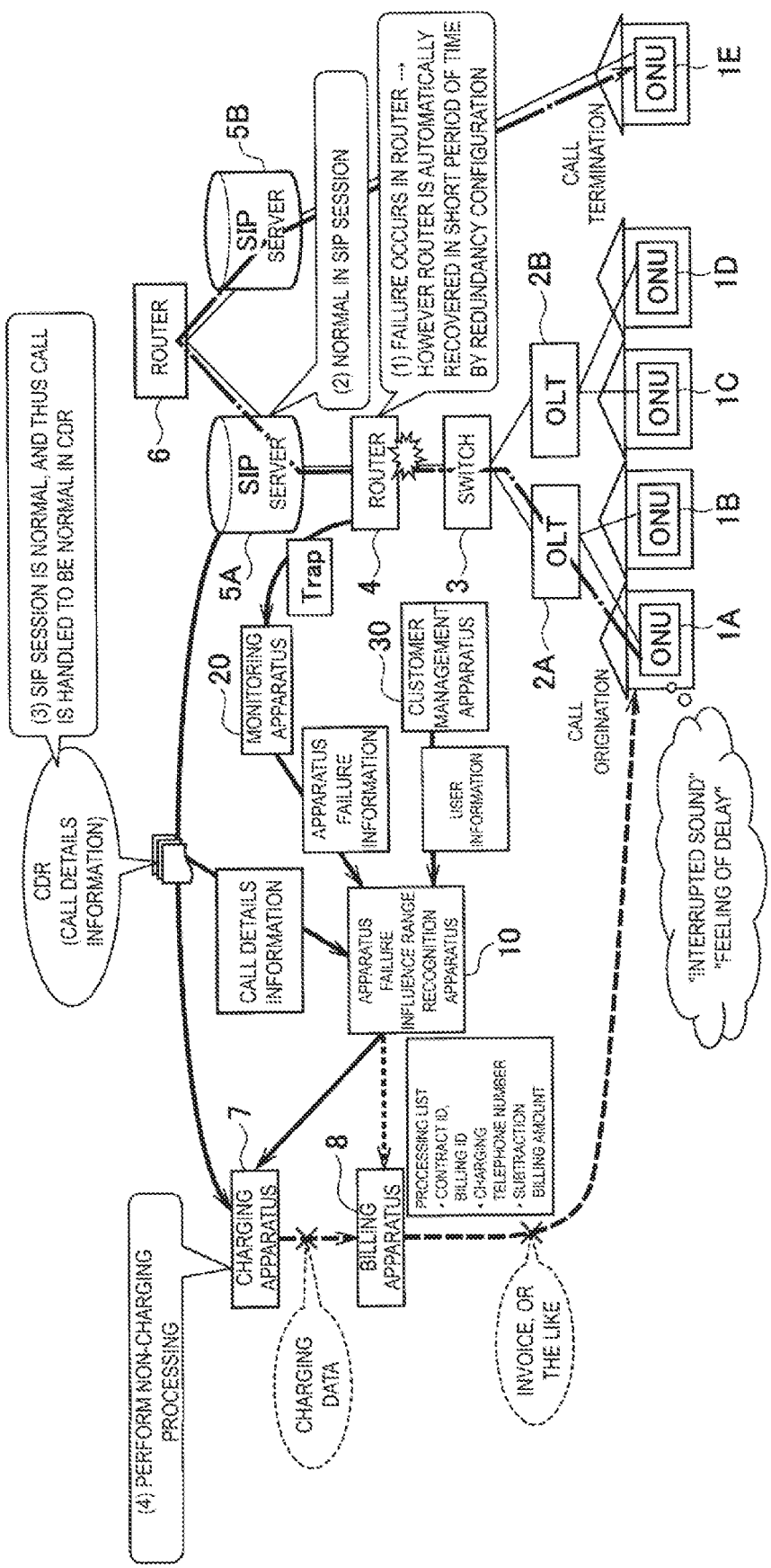
FIG. 18 is a configuration diagram illustrating Modification Example 1 of the call charge billing system of the present embodiment.

FIG. 18 is a configuration diagram illustrating Modification Example 1 of the call charge billing system of the present embodiment. As illustrated in FIG. 18, the apparatus failure influence range recognition apparatus 10, rather than automatically performing subtraction processing in cooperation with the billing apparatus 8, may cause the charging apparatus 7 to perform non-charging processing by systematically cooperating with the charging apparatus 7, for example, at the time of a CDR of a call for which a call charge is subtracted.

MODIFICATION EXAMPLE 2

Figure 19:
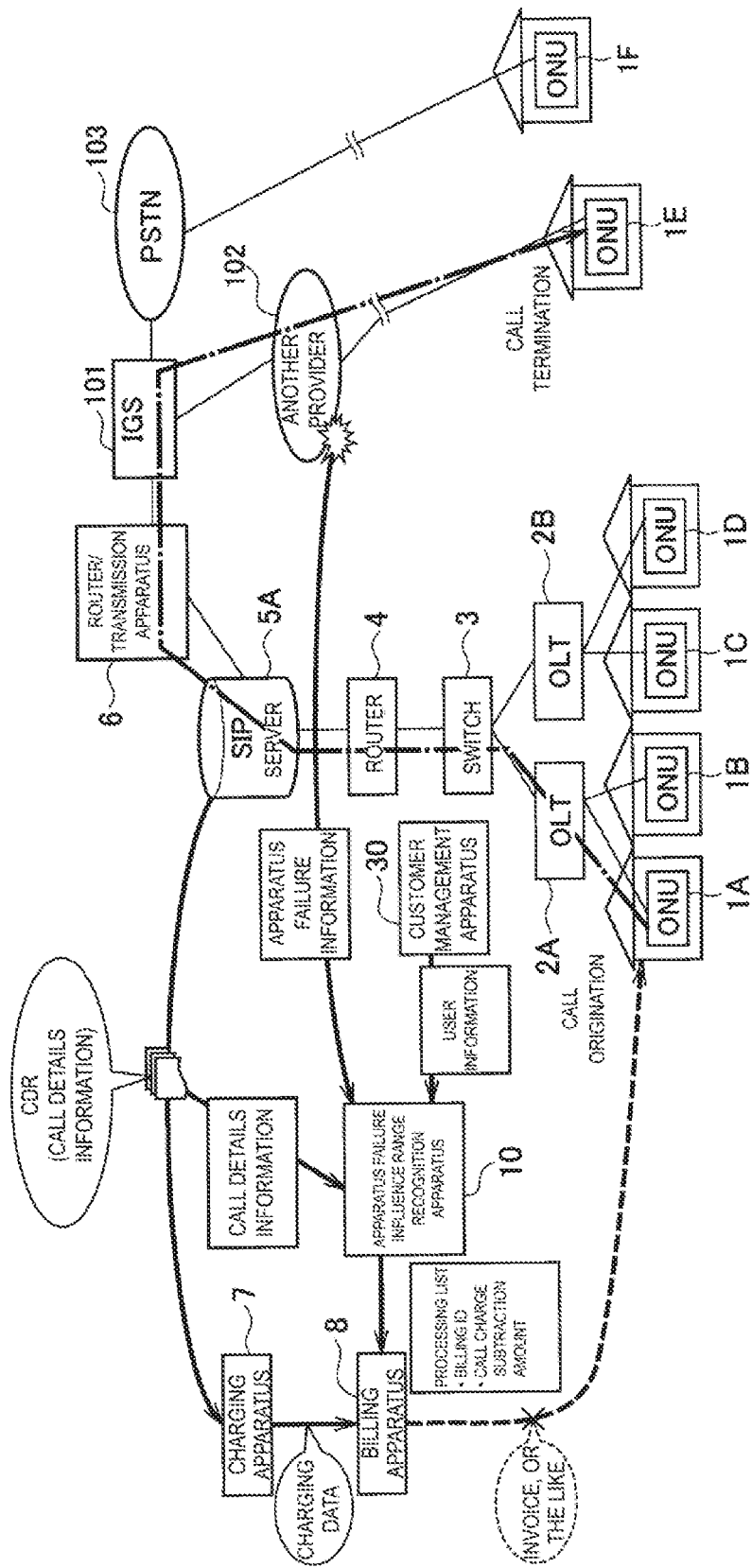
FIG. 19 is a configuration diagram illustrating Modification Example 2 of the call charge billing system of the present embodiment.

FIG. 19 is a configuration diagram illustrating Modification Example 2 of the call charge billing system of the present embodiment. As illustrated in FIG. 19, a call charge of an IP telephone user of its own company may be subtracted due to a failure in an apparatus of another provider 102 by using an identical system. In this case, the apparatus failure influence range recognition apparatus 10 may achieve automatic subtraction processing on the basis of apparatus failure information or non-charging target call information received from another provider 102.

MODIFICATION EXAMPLE 3

Figure 20:
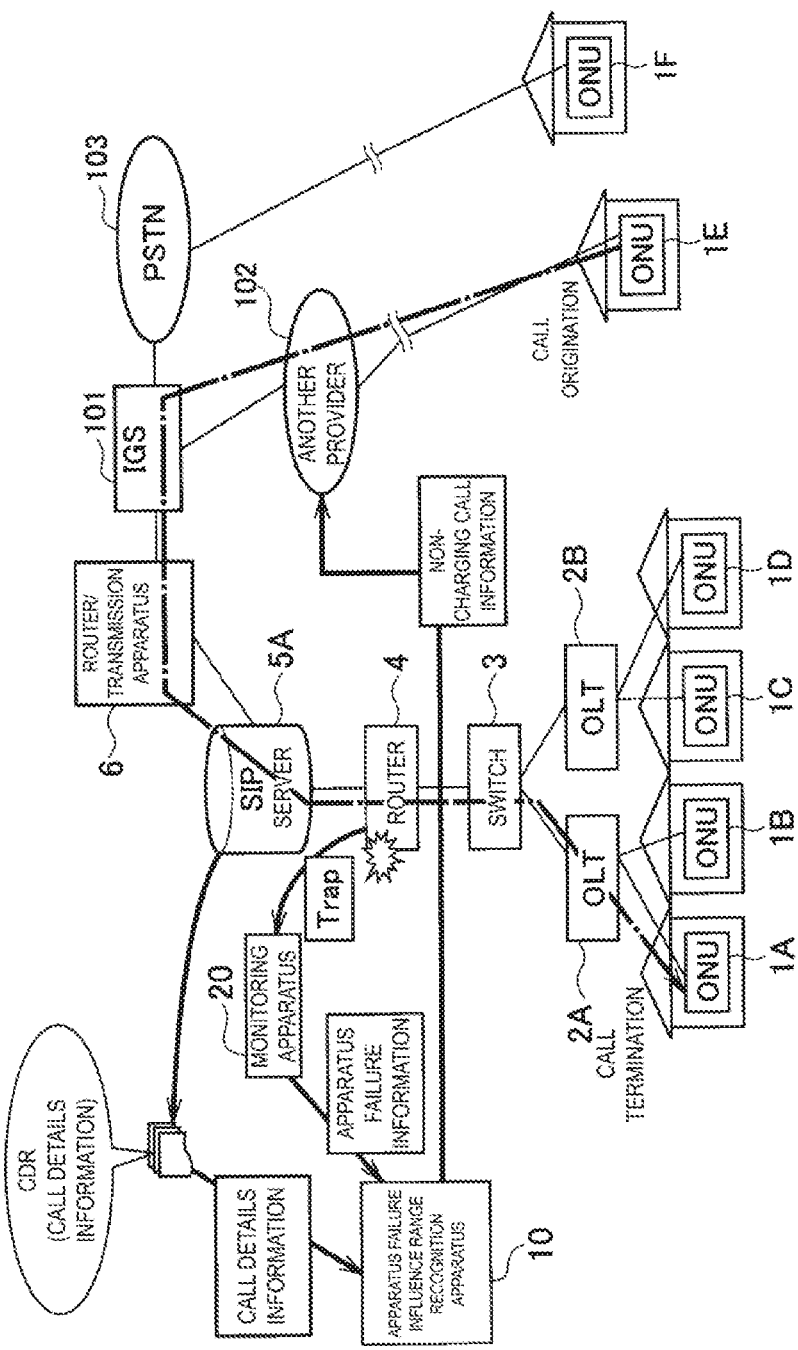
FIG. 20 is a configuration diagram illustrating Modification Example 3 of the call charge billing system of the present embodiment.

FIG. 20 is a configuration diagram illustrating Modification Example 3 of the call charge billing system of the present embodiment. As illustrated in FIG. 20, the apparatus failure influence range recognition apparatus 10 is also useful for influenced call information creation processing in a case where a failure in an apparatus of its own company may influence a call for which another provider 102 has the right to billing a charge. In this case, a CDR generated by the SIP server 5A is not for charging but may be just a CDR as a log.

Effects

According to the present embodiment, in a case where a call charge is billed regardless of a voice transmission service not being provided in the related art, a proper call charge billing can be made, and thus itis possible to optimize a relationship between service provision and charge collection. Processing of manually performing data collation is automatized, and thus it is possible to prevent human errors, to make operations efficient, and to make the overall work prompt (to reduce a call charge within a billing month).

CONCLUSION

As described above, the apparatus failure influence range recognition apparatus 10 of the present embodiment includes the reception unit 11 that receives apparatus failure information which is failure information of an element constituting a network, user information which is information regarding a user of a service, and call details information of an IP telephone, and the calculation unit 13 that calculates a subtracted call charge with respect to a call charge for a suspected call influenced by an apparatus failure by linking the apparatus failure information, the user information, and the call details information with each other. Consequently, it is possible to achieve proper billing for a call charge for a call suspected of non-provision of a service.

For example, in a case where a service-influencing failure which is a failure influencing a voice quality of an IP telephone service occurs, the calculation unit 13 may extract the call details information of a call charge subtraction target based on the apparatus failure information and the user information, compute a call charge based on the extracted call details information, and calculate a subtracted call charge for each billing ID. Consequently, it is possible to accurately and promptly calculate a subtracted call charge.

The calculation unit 13 may extract call information that overlaps with a period between time of the occurrence of the service-influencing failure and time of the recovery from the failure, and then extract call information in which a service is influenced based on a calling telephone number or number range pair information. Consequently, it is possible to more accurately and promptly calculate a subtracted call charge.

In a case where the service-influencing failure occurs due to a failure in a relay router, the calculation unit 13 may extract each piece of number range information from telephone number information of the call details information to create a calling/called number range pair, and collate the created calling/called number range pair with a "call influencing calling/called number range pair" registered in advance for each apparatus to create call details information f a call charge subtraction target. In other words, although the relay router does not recognize each user, even in a case where the relay router has failed, it is possible to accurately and promptly calculate a subtracted call charge by creating supplementary information.

The calculation unit 13 may calculate a subtracted call charge with respect to a call in which a C plane is normal, and a U plane is suspected of being abnormal. Consequently, it is possible to automatically exclude a call in which a C plane is normal and a U plane is suspected of being abnormal, from a charging target.

The present embodiment may be achieved not only the apparatus failure influence range recognition apparatus 10 but also an apparatus failure influence range recognition method with the characteristic processing units of the apparatus failure influence range recognition apparatus 10 as steps or a program causing a computer to execute the steps. Needless to say, the program can be distributed via a recording medium such as a CD-ROM or a transmission medium such as the Internet.

REFERENCE SIGNS LIST 1A, 1B, 1C, 1D, 1E, 1F, 1G ONU
2A, 2B OLT
3 Switch
4 Router
5A, 5B SIP server
6 Router/transmission apparatus
7 Charging apparatus
8 Billing apparatus
10 Apparatus failure influence range recognition apparatus
11 Reception unit
12 Storage unit
13 Calculation unit
14 Transmission unit
20 Monitoring apparatus
30 Customer management apparatus

The invention claimed is:

1. An apparatus failure influence range recognition apparatus comprising:
a reception unit, including one or more processors, configured to receive apparatus failure information which is failure information of an element constituting a network, user information which is information regarding a user of a service, and call details information of an Internet protocol (IP) telephone; and
a calculation unit, including one or more processors, configured to calculate, by linking the apparatus failure information, the user information, and the call details information with each other, a subtracted call charge with respect to a call charge for a suspected call influenced by an apparatus failure, wherein to calculate the subtracted call charge comprises:

in a case where a service-influencing failure, which is a failure influencing a voice quality of an IP telephone service, occurs, to extract the call details information of a call charge subtraction target based on the apparatus failure information and the user information, to compute the call charge based on the extracted call details information, and to calculate the subtracted call charge for each billing identity (ID).

2. The apparatus failure influence range recognition apparatus according to claim 1, wherein, the calculation unit is configured to extract call information that overlaps with a period between time of occurrence of the service-influencing failure and time of recovery from the service-influencing failure, and then extract call information in which a service is influenced based on a calling telephone number or number range pair information.

3. The apparatus failure influence range recognition apparatus according to claim 2, wherein, in a case where the service-influencing failure occurs due to a failure in a relay router, the calculation unit is configured to extract each piece of number range information from telephone number information of the call details information to create a calling/called number range pair, and collate the created calling/called number range pair with a "call influencing calling/called number range pair" registered in advance for each apparatus to create the call details information of the call charge subtraction target.

4. The apparatus failure influence range recognition apparatus according to claim 1, wherein the calculation unit is configured to calculate the subtracted call charge with respect to a call in which a C plane is normal, and a U plane is suspected of being abnormal.

5. An apparatus failure influence range recognition method executed by a computer, the method comprising:

receiving apparatus failure information which is failure information of an element constituting a network, user information which is information regarding a user of a service, and call details information of an Internet protocol (IP) telephone; and calculating, by linking the apparatus failure information, the user information, and the call details information with each other, a subtracted call charge with respect to a call charge for a suspected call influenced by an apparatus failure, wherein calculating the subtracted call charge comprises:

in a case where a service-influencing failure, which is a failure influencing a voice quality of an IP telephone service, occurs, extracting the call details information of a call charge subtraction target based on the apparatus failure information and the user information, computing the call charge based on the extracted call details information, and calculating the subtracted call charge for each billing identity (ID).

6. A non-transitory computer readable medium storing one or more instructions causing a computer to execute:

receiving apparatus failure information which is failure information of an element constituting a network, user information which is information regarding a user of a service, and call details information of an Internet protocol (IP) telephone; and calculating, by linking the apparatus failure information, the user information, and the call details information with each other, a subtracted call charge with respect to a call charge for a suspected call influenced by an apparatus failure, wherein calculating the subtracted call charge comprises:

in a case where a service-influencing failure, which is a failure influencing a voice quality of an IP telephone service, occurs, extracting the call details information of a call charge subtraction target based on the apparatus failure information and the user information, computing the call charge based on the extracted call details information, and calculating the subtracted call charge for each billing identity (ID).

7. The apparatus failure influence range recognition method according to claim 5, further comprising:

extracting call information that overlaps with a period between time of occurrence of the service-influencing failure and time of recovery from the service-influencing failure; and extracting call information in which a service is influenced based on a calling telephone number or number range pair information.

8. The apparatus failure influence range recognition method according to claim 7, further comprising:

in a case where the service-influencing failure occurs due to a failure in a relay router, extracting each piece of number range information from telephone number information of the call details information to create a calling/called number range pair; and collating the created calling/called number range pair with a "call influencing calling/called number range pair" registered in advance for each apparatus to create the call details information of the call charge subtraction target.

9. The apparatus failure influence range recognition method according to claim 5, further comprising:

calculating the subtracted call charge with respect to a call in which a C plane is normal, and a U plane is suspected of being abnormal.

10. The non-transitory computer readable medium according to claim 6, wherein the one or more instructions further cause the computer to execute:

extracting call information that overlaps with a period between time of occurrence of the service-influencing failure and time of recovery from the service-influencing failure; and extracting call information in which a service is influenced based on a calling telephone number or number range pair information.

11. The non-transitory computer readable medium according to claim 10, wherein the one or more instructions further cause the computer to execute:

in a case where the service-influencing failure occurs due to a failure in a relay router, extracting each piece of number range information from telephone number information of the call details information to create a calling/called number range pair; and collating the created calling/called number range pair with a "call influencing calling/called number range pair" registered in advance for each apparatus to create the call details information of the call charge subtraction target.

12. The non-transitory computer readable medium according to claim 6, wherein the one or more instructions further cause the computer to execute:
  calculating the subtracted call charge with respect to a call in which a C plane is normal, and a U plane is suspected of being abnormal.

* * * * *